US006956906B2

(12) United States Patent
Tager et al.

(10) Patent No.: US 6,956,906 B2
(45) Date of Patent: Oct. 18, 2005

(54) POWERLINE DATA COMMUNICATION

(75) Inventors: Wolfgang Tager, Müchen (DE); Stephan Pohl, Wihelmshaven (DE); Matthias Stoger, Müchen (DE)

(73) Assignee: Polytrax Information Technology AG, Munich (DE)

( * ) Notice: Subject to any disclaimer, the term of this patent is extended or adjusted under 35 U.S.C. 154(b) by 728 days.

(21) Appl. No.: 09/838,565

(22) Filed: Apr. 19, 2001

(65) Prior Publication Data

US 2003/0016123 A1 Jan. 23, 2003

(51) Int. Cl.[7] ................................................ H04L 27/28
(52) U.S. Cl. ...................................................... 375/260
(58) Field of Search ................................ 375/260, 288, 375/295, 299; 370/468, 480, 538

(56) References Cited

U.S. PATENT DOCUMENTS

| | | | | |
|---|---|---|---|---|
| 4,679,227 A | | 7/1987 | Hughes-Hartogs et al. | 379/98 |
| 5,479,447 A | | 12/1995 | Chow et al. | 375/260 |
| 5,960,003 A | | 9/1999 | Fischer et al. | 370/468 |
| 6,005,477 A | | 12/1999 | Deck et al. | 340/310.02 |
| 6,516,027 B1 | * | 2/2003 | Kapoor et al. | 375/227 |

FOREIGN PATENT DOCUMENTS

| | | | |
|---|---|---|---|
| DE | 196 07 207 A1 | 8/1997 | H04J/3/16 |
| DE | 197 16 011 A1 | 10/1998 | H04B/3/54 |
| WO | WO 99/16224 | 4/1999 | H04L/27/26 |

OTHER PUBLICATIONS

Proakis, J.G., "Digital Communications" *McGraw–Hill, 3rd* Edition; pp. 687–688 (1995).

* cited by examiner

*Primary Examiner*—Stephen Chin
*Assistant Examiner*—Kevin Kim
(74) *Attorney, Agent, or Firm*—Dorsey & Whitney LLP

(57) ABSTRACT

Data communication between two devices (11, 12) over the public powerline network (13) uses a multi carrier technology wherein a communication channel is divided into a plurality of subchannels by frequency division multiplexing. A partial power as part of the total transmission power and a partial rate as a fraction of the total data rate are assigned to each subchannel as follows:

Initially, the same partial power is assigned to each subchannel and the S/N ratio of each subchannel is obtained. Starting with the subchannel of the lowest S/N ratio and proceeding to that of the highest S/N ratio, the following steps are performed for each subchannel:

Firstly, the partial rate is assigned in accordance with the respective S/N ratio such as to result in a predetermined transmission error rate. The assigned partial rate is then quantised to an integral value. If the quantising corresponds to a rounding down, the initially assigned partial power is reduced such that the transmission error rate remains the same as before quantisation. Further, the partial power of other subchannels with higher S/N ratio is increased such that the sum of all partial powers remains constant. Eventually, the increased S/N ratio resulting from increasing the partial power for these subchannels is calculated so that, when the present steps are conducted for them, an optimum partial rate can be assigned to them.

This method maximises the total data rate of the entire communication channel while the error rate of each subchannel and the sum of all partial powers remain constant.

9 Claims, 3 Drawing Sheets

(a)

(b)

(c)

POWERLINE DATA COMMUNICATION

FIELD OF THE INVENTION

Background of the Invention

The invention relates to a method and an apparatus for data communication over a powerline network.

There exist different national and international standards for data communication over the public powerline network, e.g. the low voltage network of 230 V in Central Europe or 110 V in the US. the standards restrict transmission to certain frequency bands and limit the transmission power. To well use a transmission channel within these limitations, the technology of multiple carrier transmission was proposed.

This technology divides a transmission channel into N independent subchannels generally having the same bandwidth, e.g. having in a frequency division multiplexing technique a constant frequency separation between them. The data stream to be transmitted is separated into substreams and transmitted on the subchannels. These technologies are called "Discrete Multitone" DMT, "Multicarrier Modulation" MCM or "Orthogonal Frequency Division Multiplexing" OFDM.

Multicarrier transmission over the powerline is known for example from DE-A-19716011. According to this prior art, the data stream to be transmitted is divided into parallel substreams each transmitted by the same modulation scheme on one subchannel. It is mentioned that powerlines are subject to narrow band noise and linear channel distortions which can be relatively well corrected in the multicarrier technology. However, the necessary error correcting scheme by means of channel coding to recover data from disturbed subchannels is relatively complicated.

It is also known that multicarrier transmission offers the possibility to assign an individual modulation rate (partial rate) and an individual transmission power (partial power) to each subchannel, as part of the total data rate and total transmission power. To achieve a fast and reliable data transmission, strongly attenuated or disturbed subchannels get a smaller partial rate and/or partial power than less impaired subchannels. This reduces or avoids the overhead for error correction by channel coding.

The average amount of information of a complex symbol modulated onto subchannel i is called the partial (modulation-) rate R(i). The total data rate, more precisely the average information content $R_{ges}$ of the entire symbol (e.g. OFDM symbol), i.e. the information content of all N subchannels is thus the sum of the partial rates:

$$R_{ges} = \sum_{i=0}^{N-1} R(i). \tag{1}$$

The total transmission power, more precisely the average transmission power $S_{ges}$ of the entire symbol is the sum of the partial powers S(i) of the subchannels:

$$S_{ges} = \sum_{i=0}^{N-1} S(i). \tag{2}$$

J. G. Proakis: "Digital Communications", McGraw-Hill, 3rd edition, 1995, discloses on pages 687 to 688 a method for distributing the partial powers to the subchannels for theoretically maximising the total channel capacity. This method is known as "water-filling method" and chooses the partial power such that the sum of the signal power and the noise power is constant. To maximise the transmission rate, the partial rates $R(i)=\Delta f \cdot \log_2(1+SNR(i))$ are chosen so as to be equal to the capacities of the subchannels, wherein Δf and SNR(i) are the bandwidth and the signal to noise ratio (S/N ratio) of subchannel i. A disadvantage of this method resides in that calculation of the partial powers is extremely complex and the partial rates assume generally non-integer values.

To overcome these deficiencies, several methods for partial rate and partial power assignment have been proposed which are easier to implement although they have not the same effectivity to maximise the total channel capacity:

[Hughes-Hartogs]

U.S. Pat. No. 4,679,227 discloses a method which first estimates the noise power on each subchannel. Then, a number of transmission powers is obtained for each subchannel as necessary to transmit on the subchannel with a number of possible partial rates at a predetermined error probability. Subsequently, "incremental powers" are calculated which indicate the additional power necessary for each subchannel of a certain partial rate to achieve the next higher partial rate without changing the error rate. The incremental powers are arranged in a matrix. Step by step, the smallest element is searched in the matrix and is deleted until a predetermined total transmission rate or a maximum allowable transmission power has been reached.

[Cioffi et al.]

U.S. Pat. No. 5,479,447 relates to communication over subscriber lines and teaches to estimate the S/N ratio SNR of each subchannel based on a transmission power evenly distributed on the subchannels. Then, values SNR/Γ are sorted in descending order. The parameter Γ is called SNR Gap and expresses the loss in power efficiency of a real communications system compared to a theoretically optimum system. The method provides then for a loop which assigns a partial rate $R(i)=\log_2(1+SNR(i)/\Gamma)$ to each subchannel i. The assignment is made by making a distinction between the case of evenly distributed transmission power and the case of a maximum admissible partial power. Among these cases, that one is selected which results in the smaller partial rate. In a next step, the total power is distributed to the subchannels such that all of them have the same transmission error probability. Finally, a scaling of the power is performed.

[Hyll]

According to WO 99/16224, the standard deviation of a noise signal is obtained for each subchannel and is compared with a predetermined threshold. The result is used as a reference to a lookup table to obtain the partial rate of the subchannel. There are no specific steps for distributing the total power to the subchannels.

[Fischer et al.]

DE-A-19607207 discloses a method for distributing the data rate to the subchannels with a view not to the channel capacity but to the minimum Euklidic distance between symbols in a QAM scheme. A predetermined total data rate is distributed to the individual subchannels maintaining a constant total transmission power.

SUMMARY OF THE INVENTION

It is an object of the invention to provide a method and an apparatus for data communication over a powerline network which are relatively simple and use a predetermined transmission channel efficiently.

The present invention provides a method for data communication over a powerline network, wherein a transmission channel is divided into a plurality of subchannels each having a partial power as its part of a predetermined total transmission power and a partial rate as its data rate, wherein initially a partial power is fixed and a signal to noise ratio is obtained for each subchannel and the subchannels are then processed one after the each other with the following steps:

(a) calculating the partial rate of the present subchannel in accordance with its signal to noise ratio so as to result in a predetermined transmission error rate, (b) quantising said calculated partial rate, and (c) adapting the partial power of the present subchannel to a change of the partial rate due to said quantisation, so that said predetermined transmission error rate of the present subchannel is maintained; determining the partial power of another subchannel anew based on the adapted partial power of the present subchannel so that the said predetermined total transmission power of all subchannels is maintained; and obtaining a signal to noise ratio of said other subchannel in adaptation to its newly determined partial power.

The present invention also provides an apparatus for data communication over a powerline network wherein a transmission channel is divided into a plurality of subchannels each having a partial power as its part of a predetermined total transmission power and having a partial rate as its data rate, comprising:

means for initially determining a partial power and obtaining a signal to noise ratio for each subchannel and for then processing the subchannels one after the other with:

a processor for: calculating the partial rate of the presently processed subchannel in accordance with its signal to noise ratio so as to result in a predetermined transmission error rate; quantising the calculated partial rate; adapting the partial power of the present subchannel in accordance with a change in the partial rate due to said quantisation, so that said predetermined transmission error rate of the present subchannel is maintained; newly determining the partial power of another subchannel in accordance with said adapted partial power of the present subchannel so that said predetermined total transmission power of all subchannels is maintained; and obtaining a signal to noise ratio of said other subchannel in adaptation to its newly determined partial power.

According to the invention, the transmission channel is divided into plural subchannels and the total data rate is maximised by appropriately selecting respective data rates (partial rates) and respective transmission powers (partial powers) of the subchannels in accordance with their respective signal to noise ratios while a predetermined transmission error rate of each subchannel and a predetermined total transmission power of all subchannels are observed.

Data communication is simplified by quantising the respective partial rates to assume integer values. Namely, an integer number of data bits is transmitted on each subchannel within a predetermined unit time. This simplifies dividing the entire data stream into substreams for transmission on the subchannels.

However, the quantisation results also in a deviation of the partial rate from a partial rate initially calculated in accordance with the respective signal to noise ratio of the subchannel from said predetermined transmission error rate and an initially assigned partial power. Without further measures, the deviation in the partial rate would lead to a change in the transmission error rate. But to compensate for the deviation, the partial power is adapted such that the transmission error rate remains unchanged in spite of the quantisation.

For example, if the quantisation leads to a reduction or a down rounding of the partial rate to an integer value, the partial power is reduced accordingly so that the transmission error rate remains the same as before quantisation of the partial rate.

To keep the total transmission power at its predetermined value in spite of these measures, the partial powers of other subchannels are then adapted accordingly. And the signal to noise ratios of the other subchannels are updated in accordance with the adapted partial powers so that, later, an optimised partial rate can also be calculated for these other subchannels.

In the above example, the partial power of the subchannel first subjected to the method of the invention has been reduced as a result of said quantisation and accordingly, the partial powers of other subchannels are increased and their signal to noise ratios increase also. When the partial rates of these subchannels are then also assigned, they will be higher than without said adaptations. This optimises the total data rate.

The invention allows to predetermine the error rate in accordance with the information service for which the data communication is used. Speech services for example tolerate higher error rates than other data transmission services. If an error correcting process is used, the transmission error rate can be predetermined such that the used process can correct the transmission errors.

One embodiment of the present invention is implemented in a digital signal processor.

Also, in one embodiment, the present invention obtains the signal to noise ratio for each subchannel at the beginning of the method.

Distributing the transmitted data stream to the subchannels and using methods for error correction in the transmitted data can be simplified if the transmission error rate is the same for each subchannel.

The transmission conditions on the power line can change in a time scale of seconds or minutes, e.g. when loads are switched on or off. This changes the signal to noise rations of the individual subchannels. Therefore, the signal to noise ratios are preferably obtained again every 0.5 seconds to 30 minutes and steps (a) to (c) are then re-executed for each subchannel. It is more efficient, however, not to execute these steps always after a fixed time period but only if it is judged during data communication that the actual transmission error rate of one or more subchannels differs from the predetermined transmission error rate by at least a certain difference value. Preferably obtaining the signal to noise rations and executing steps (a) to (c) again is restricted to only those subchannels which are affected by the changes in the transmission error rates.

A preferred type of modulation for transmitting the partial data rates on the subchannels is quadrature amplitude shift key.

A preferred embodiment of the invention will now be explained with reference to the drawings.

DETAILED DESCRIPTION OF THE PREFERRED EMBODIMENT

Figure 1:
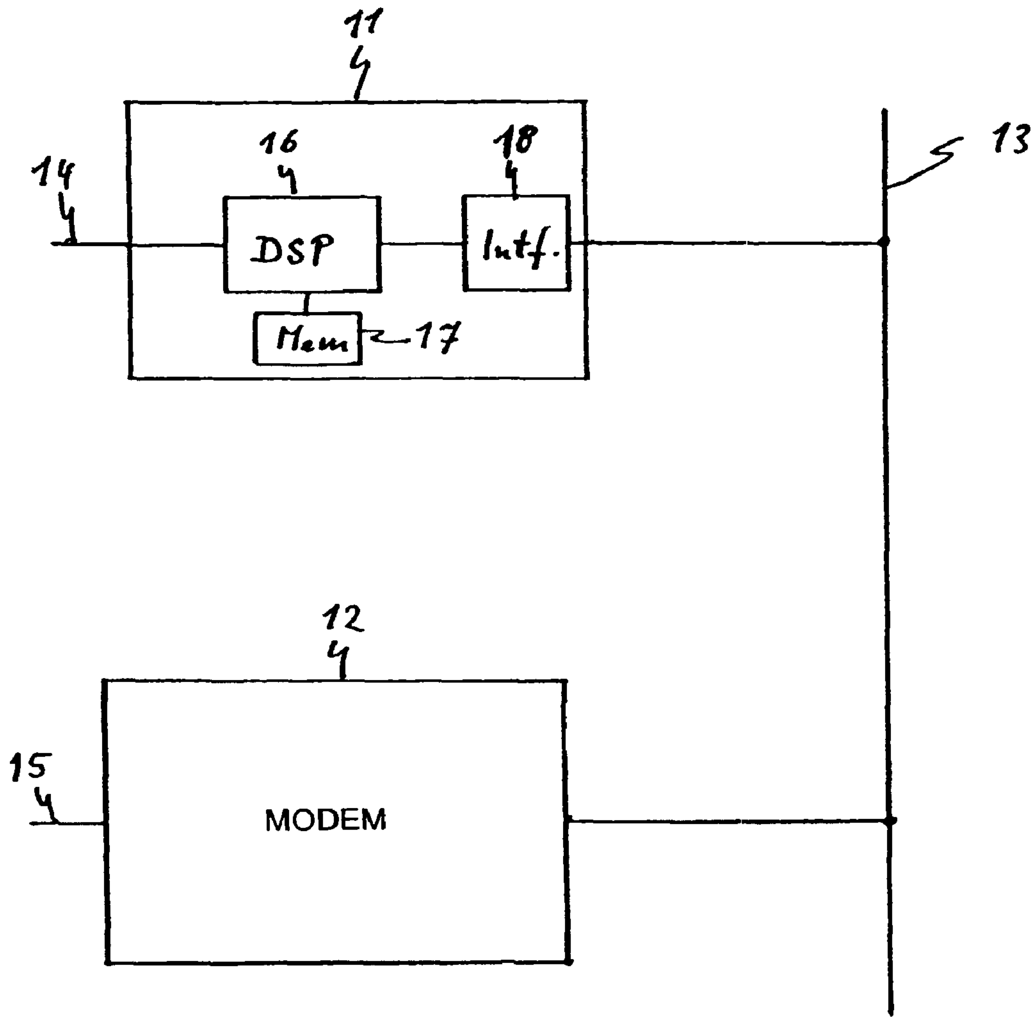
FIG. 1 shows schematically a system for data communication on the powerline network.

The system shown in FIG. 1 contains two modems 11, 12 which receive data on an application-side terminal 14, 15 and transmit the data in the form of modulated signals over a powerline network 13. They also receive signals from the powerline network 13, demodulate them and output data contained therein on the application-side terminals 14, 15. Each modem 11, 12 contains a digital signal processor 16 which converts the modulated signals on the powerline network 13 into the data at the application-side terminals 14, 15 and vice versa and operates according to data and a program stored in a memory 17. The digital signal processor 16 is provided with an interface 18 to communicate the modulated signals to and from the powerline network 13 but to separate the digital signal processor from the mains voltage on the powerline network 13.

Communication on the powerline network 13 is conducted using a multicarrier technique within a transmission channel. A plurality of carrier signals are transmitted within the frequency band of the transmission channel and each carrier is modulated by quadrature amplitude shift keying (QAM) with the data to be transmitted and thus forms a subchannel.

Figure 2:
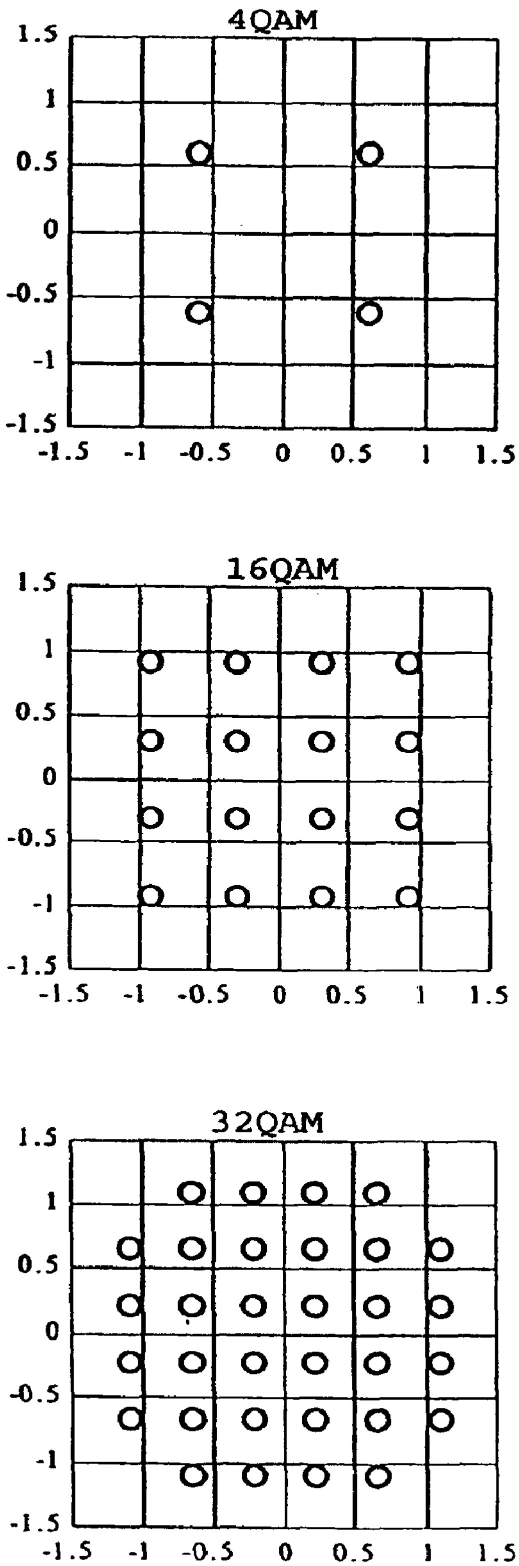
FIG. 2 is a diagram for explaining quadrature amplitude shift keying.

Different quadrature amplitude shift keying schemes of different capacity are shown in FIGS. 2(*a*) to (*c*). Each figure shows the different signal states which can be assumed by amplitude and phase of the carrier signal in a complex plane. 4 QAM as shown in FIG. 2(*a*) allows four signal states and can thus transmit a 2-bit symbol in one time unit of e.g. 5.33 ms. Similarly, 16 QAM and 32 QAM as shown in FIGS. 2(*b*) and (*c*) can transmit a 4-bit and a 5-bit symbol. Assuming that all signal states in each of FIGS. 2(*a*) to (*c*) are equally likely, the figures represent the same average transmission power.

The digital signal processor 16 operates to assign subchannels of low signal to noise ratio a small data rate (partial rate) of e.g. 2 bits per time unit corresponding to 4 QAM, and assigns subchannels of higher signal to noise ratio higher data rates (partial rates) of e.g. 4 bits per time unit or 5 bits per time unit, corresponding to 16 QAM or 32 QAM. The method for conducting these assignments will now be explained:

The modulation rate for each subchannel is called partial rate R(i). Of the total power $S_{ges}$, the fraction of subchannel i among N subchannels, i.e. the power distribution is designated by a power distribution function PDF(i) in relative units. Subchannel i has thus in absolute units the partial power $S(i)=S_{ges}\cdot PDF(i)$, wherein:

$$\sum_{i=0}^{N-1} PDF(i) = 1. \tag{3}$$

The distribution of the data rate and transmission power to the subchannels is carried out by the following steps for a predetermined total transmission power and for a predetermined transmission error rate which is the same for each subchannel:

1) Starting out from the same partial power $S_{ges}/N$ for each subchannel, corresponding to a power distribution of PDF(i)=1/N, the signal to noise ratio SNR is estimated for each of the N subchannels. The estimation will be explained in more detail below.

2) The values of the signal to noise ratio SNR are sorted and stored in descending order and stored in an SNR list. The association between each of the sorted SNR values and the subchannel to which it belongs is also stored so that the sorting corresponds to a sorting of the subchannels and can be made undone.

3) The distribution of the data rate and power is conducted within a loop processed for each of the N elements of the sorted SNR list. The loop counter i runs through the values N−1, . . . 0, starting with the last element of the sorted SNR list, i.e. with the subchannel of smallest SNR value:

a) The partial rate $$R(i) = \log_2\left(1 + \frac{SNR(i)}{\Gamma}\right) \tag{4}$$

is assigned to present subchannel i, wherein Γ is a constant representing the predetermined error rate.

b) Then, the partial rate is quantised to obtain a nearby integer value $R_Q$:

$$R_Q(i) = \begin{cases} R_{\max} & R(i) \geq R_{\max} \\ \lfloor R(i) \rfloor & \text{otherwise} \\ 0 & R(i) < 2 \end{cases}, \tag{5}$$

wherein transmission on a used subchannel is made at least with 4 QAM corresponding to a partial rate of two and at most with a predetermined maximum partial rate $R_{max}$. The operator [x] designates the largest integer smaller or equal to x. The quantisation can thus lead to a reduction of the partial rate.

c) Without further measures, a reduction of the partial rate by quantisation would result in a smaller error rate of the present subchannel. However, to maintain the predetermined error rate, the partial transmission power S(i) is adapted so that the effect of the rate quantisation on the error rate is compensated, as long as i>0. This is accomplished by reducing the portion of the total power assigned to subchannel i. The amount of the reduction is added in equal proportion to the remaining, not yet processed subchannels j=0, . . . , i−1 from the SNR list, i.e. to the subchannels with higher SNR value, so that the total power remains unchanged. The SNR values of these remaining subchannels had originally be obtained under the assumption of a uniform distribution of the total power to the subchannels and are now increased by the same factor by which the respective partial power is increased. Therefore, all further passes of the loop will then assign a higher partial rate to these remaining subchannels and the total data rate of the transmission channel is maximised. Preferably, this adaptation of the power distribution and of the SNR values is conducted by the following substeps:

i) Firstly, the following auxiliary value is calculated:

$$\Delta = 1 - \frac{2^{R_Q(i)} - 1}{2^{R(i)} - 1} \tag{6}$$

ii) The fraction the current subchannel i receives from the total power must be reduced by Δ·PDF(i). The amount of power thus obtained must be equally distributed to the remaining subchannels. To prepare this, the SNR values of these remaining subchannels are adapted to the new power distribution:

$$SNR(j) := SNR(j) + SNR(j)\cdot\Delta\cdot PDF(i)/(i\cdot PDF(j)) \text{ for } j=0, \ldots, i-1. \tag{7}$$

iii) Eventually, the new power distribution is made:

$$PDF(j) := \begin{cases} PDF(i) - \Delta \cdot PDF(i) & j = i \\ PDF(j) + \Delta \cdot PDF(i)/i & \text{otherwise} \end{cases} \quad (8)$$

for $j = 0, \ldots, i$.

d) If i>0, the loop counter is decremented, i.e. is reduced by one and the method proceeds with step 3*a*).

4) Finally, the rate and power distribution as obtained by steps 3*a* to *c*) and recorded in the SNR list is assigned to the subchannels in their original order by referring to the association stored in step 2).

As a result, for each reduction of the partial rate of a subchannel due to quantisation, this method increases the partial power, the signal to noise ratio and the partial rate of each subchannel in the list having a better signal to noise ratio. This maximises the total data rate of the communication channel.

For estimating the signal to noise ratio SNR in above step 1), modem 11, 12 transmits the same signal state n times on each of the N subchannels. The signal state transmitted corresponds to an arbitrary point in the complex diagrams of FIGS. 2(*a*) to (*c*). In a different modem 12, 11 receiving the transmitted signals over the communication channel, the n received signal states correspond again to points having complex coordinates Y(k) with (k=0, . . . , n−1). The received modem estimates for each subchannel the complex average value $\hat{m}_Y$ and the variance $\hat{\sigma}_Y^2$:

$$\hat{\sigma}_Y^2 = \frac{1}{n-1}\sum_{k=0}^{n-1} |Y(k) - \hat{m}_Y|^2 \text{ and } \hat{m}_Y = \frac{1}{n}\sum_{k=0}^{n-1} Y(k). \quad (9)$$

These estimations are called point estimators and are described e.g. in Papoulis: "Probability, Random Variables and Stochastic Processes", McGraw-Hill, 3rd Edition, 1991. Preferably, equation (9) is computed for all subchannels in parallel in the digital signal processor 16, using an iterative method which replaces the calculation of averages by a calculation of sliding averages. A sliding average has the advantage that only the present estimation for the average value and the variance have to be stored for each subchannel.

The signal to noise ratio for each of the N subchannels is finally calculated as follows:

$$SNR = \frac{|\hat{m}_Y|^2}{\hat{\sigma}_Y^2}. \quad (10)$$

Figure 3:
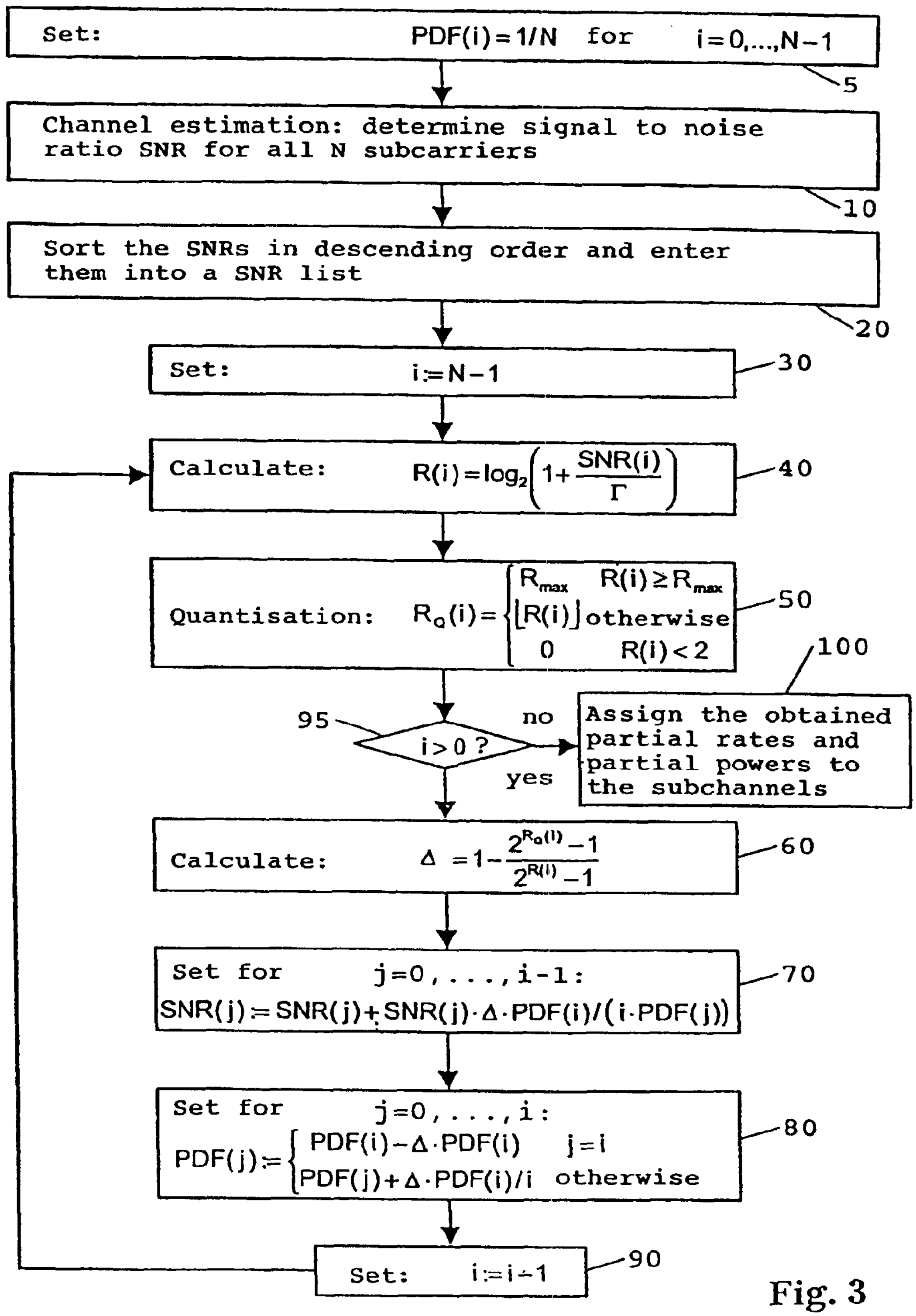
FIG. 3 is a flowchart of a method for optimising the data transmission rate.

Referring to FIG 3, the operation of the embodiment is summarised as follows:

After the transmission power has been equally distributed in step 5 and the signal to noise ratio SNR has been estimated for each of the N subchannels in step 10, the SNR values are sorted in 20 in descending order and are stored in an SNR list. The relationship between the sorted arrangement and the original order is stored such that the sorting can be reversed. Sorting is done by a conventional sorting algorithm. Then, a loop is processed for all elements of the sorted SNR list. The loop counter i designates the number of the respectively considered element in the SNR list. Starting in step 30 with the last element of the SNR list, corresponding to the loop counter i:=N−1, the partial rate R(i) is calculated (step 40) and quantised (step 50) in each pass of the loop. And by means of the auxiliary value Δ calculated in step 30, the effect of the rate quantisation is compensated by adaptation of the signal to noise ratios in step 70 and of the partial powers in step 80 such that the error rate remains unchanged. The loop counter is decremented in step 90 after each iteration. A decision is made in step 95 to check whether the loop has been processed for the last subchannel. If this is the case, the obtained partial rates and powers are assigned to the subchannels in their original order (step 100).

The process of FIG. 3 will now be explained by way of a more concrete example.

The following parameters are assumed: N=3 and Γ=10. Initially, a uniform power distribution is made in step 5:

| i | 0 | 1 | 2 |
|---|---|---|---|
| PDF(i) | 1/3 | 1/3 | 1/3 |

It is assumed that, in the present example, the estimation in step 10 has obtained the following result:

| | subchannel No. 1 | subchannel No. 2 | subchannel No. 3 |
|---|---|---|---|
| SNR | 100 | 10 | 1000 |

The SNR values are then sorted in descending order and are stored into the SNR list:

| i | 0 | 1 | 2 |
|---|---|---|---|
| SNR | 1000 | 100 | 10 |

The loop is stared in step 30 with that subchannel which has the lowest SNR value:

$i=N-1=2$

The partial rate of this subchannel is calculated in step 40 as follows:

$$R(2) = \log_2\left(1 + \frac{10}{10}\right) = 1$$

The quantisation of the partial rate in step 50 results in $R_Q(2)=0.$

It follows that this subchannel will not be used: Δ is set to 1 in step 60.

The partial power from this subchannel is therefore distributed to the remaining subchannels and the SNR list is adapted in step 70:

| i | 0 | 1 |
|---|---|---|
| SNR | 1500 | 150 |

and the power distribution is updated in step 80 as follows:

| i | 0 | 1 | 2 |
|---|---|---|---|
| PDF(i) | 1/2 | 1/2 | 0 |

After having finished the first pass of the loop, the loop counter is decremented in step 90:

$$i{:=}i-1=1$$

In the next pass of the loop, steps 40 and 50 give a partial rate of $$R(1)=\log_2\left(1+\frac{150}{10}\right)=4$$

and its quantisation $R_Q(1)=4$. Both are the same in this special case, and the power distribution remains thus unchanged: Δ=0 and steps 70 and 80 do not change the SNR list and PDF values.

After this iteration, the loop counter is again decremented: i:=i−1=1.

The final pass of the loop results in step 40 in $$R(0)=\log_2\left(1+\frac{1500}{10}\right)\approx 7{,}2$$

and in step 50 in $R_Q(0)=7$. The last subchannel does not lead to a new power distribution because there are no remaining subchannels. The branching in step 95 leads therefore to the final step 100 which assigns the obtained rate- and power-distribution to the subchannels in their original order:

| | subchannel No. 1 | subchannel No. 2 | subchannel No. 3 |
|---|---|---|---|
| $R_Q$ | 4 | 0 | 7 |
| PDF | 1/2 | 0 | 1/2 |

What is claimed is:

1. A method for data communication over a powerline network, wherein a transmission channel is divided into a plurality of subchannels each having a partial power as its part of a predetermined total transmission power and a partial rate as its data rate, wherein initially a partial power is fixed and a signal to noise ratio is obtained for each subchannel and the subchannels are then processed one after the each other with the following steps:

(a) calculating the partial rate of the present subchannel in accordance with its signal to noise ratio so as to result in a predetermined transmission error rate, (b) quantising said calculated partial rate, and (c) adapting the partial power of the present subchannel to a change of the partial rate due to said quantistion, so that said predetermined transmission error rate of the present subchannel is maintained; determining the partial power of another subchannel anew based on the adapted partial power of the present subchannel so that the said predetermined total transmission power of all subchannels is maintained; and obtaining a signal to noise ratio of said other subchannel in adaptation to its newly determined partial power.

2. A method according to claim 1, wherein the subchannels are processed one after the other starting with the one having the lowest signal to noise ratio, to that one having the highest signal to noise ratio, and the steps of (a) to (c) are conducted for each processed subchannel, said quantisation in step (b) includes a lowering of the partial rate of the presently processed subchannel to an integer value, and into step (c), the partial power of the presently processed subchannel is lowered and the partial powers and the signal to noise ratios of those other subchannels are increased accordingly, which have not yet been processed.

3. A method according to claim 1, wherein the subchannels are processed one after the other starting with the one having the highest signal to noise ratio to the one having the lowest signal to noise ratio, and steps (a) and (c) are conducted for each processed subchannel, said quantisation in step (b) includes increasing the partial rate of the processed subchannel to an integer value, and in step (c), the partial power of the processed subchannel is increased and the partial powers and the signal to noise ratios of those other subchannels which have not yet been processed are decreased accordingly.

4. A method according to claim 1, wherein the subchannels are sorted in descending order of their signal to noise ratios and are thus stored into a table held in a memory.

5. A method according to claim 1, wherein the initially determined partial power is the same for each subchannel and the initial signal to noise ratio for each subchannel is obtained by repeatedly transmitting as signal on each subchannel with the same partial power, receiving said signal, measuring for each repetition the deviation of the received signal from the transmitted signal and calculating the signal to noise ratio from an average deviation.

6. A method according to claim 1, wherein said predetermined transmission error rate is the same for all subchannels.

7. A method according to claim 1, wherein user data are subsequently communicated while repeatedly measuring the actual transmission error rate, and wherein upon a certain difference between the measured transmission error rate from said predetermined transmission error rate, the signal to noise ratio is again obtained for each subchannel and steps (a) to (c) are again executed for each subchannel.

8. A method according to claim 1, wherein data transmission on each subchannel is made by quadrature amplitude modulation.

9. An apparatus for data communication over a powerline network wherein a transmission channel is divided into a plurality of subchannels each having a partial power as its part of a predetermined total transmission power and having a partial rate as its data rate, comprising:

means for initially determining a partial power and obtaining a signal to noise ratio for each subchannel and for then processing the subchannels one after the other with:

a processor for: calculating the partial rate of the presently processed subchannel in accordance with its signal to noise ratio so as to result in a predetermined transmission error rate; quantising the calculated partial rate; adapting the partial power of the present subchannel in accordance with a change in the partial rate due to said quantisation, so that said predetermined transmission error rate of the present subchannel is maintained; newly determining the partial power of another subchannel in accordance with said adapted partial power of the present subchannel so that said predetermined total transmission power of all subchannels is maintained; and obtaining a signal to noise ratio of said other subchannel in adaptation to its newly determined partial power.

* * * * *